United States Patent
Quillen et al.

(10) Patent No.: US 9,195,293 B1
(45) Date of Patent: Nov. 24, 2015

(54) USER CONTROLLED DATA STORAGE DEVICE POWER AND PERFORMANCE SETTINGS

(71) Applicant: Western Digital Technologies, Inc., Irvine, CA (US)

(72) Inventors: Kevin S. Quillen, Berthoud, CO (US); Edwin S. Olds, Fort Collins, CO (US); Danny J. Kastler, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 132 days.

(21) Appl. No.: 13/961,799

(22) Filed: Aug. 7, 2013

Related U.S. Application Data

(60) Provisional application No. 61/819,304, filed on May 3, 2013.

(51) Int. Cl.
*G06F 1/32* (2006.01)

(52) U.S. Cl.
CPC ............ *G06F 1/3206* (2013.01); *G06F 1/3268* (2013.01)

(58) Field of Classification Search
CPC .............................. G06F 1/3206; G06F 1/3268
See application file for complete search history.

(56) References Cited

U.S. PATENT DOCUMENTS

| | | | |
|---|---|---|---|
| 5,345,347 A | 9/1994 | Hopkins et al. | |
| 5,369,771 A | 11/1994 | Gettel | |
| 5,481,733 A | 1/1996 | Douglis et al. | |
| 5,493,670 A | 2/1996 | Douglis et al. | |
| 5,544,138 A | 8/1996 | Bajorek et al. | |
| 5,638,541 A | 6/1997 | Sadashivaiah | |
| 5,682,273 A | 10/1997 | Hetzler | |
| 5,774,292 A | 6/1998 | Georgiou et al. | |
| 5,801,894 A | 9/1998 | Boutaghou et al. | |
| 5,872,669 A | 2/1999 | Morehouse et al. | |
| 5,913,067 A | 6/1999 | Klein | |
| 5,954,820 A | 9/1999 | Hetzler | |
| 6,161,187 A | 12/2000 | Mason et al. | |
| 6,192,480 B1 | 2/2001 | Barrus | |
| 6,608,729 B1 | 8/2003 | Willems et al. | |
| 6,622,252 B1 | 9/2003 | Klaassen et al. | |
| 6,657,811 B1 | 12/2003 | Codilian | |
| 6,725,385 B1 | 4/2004 | Chu et al. | |
| 6,845,456 B1 | 1/2005 | Menezes et al. | |
| 6,856,556 B1 | 2/2005 | Hajeck | |
| 6,892,313 B1 | 5/2005 | Codilian et al. | |
| 6,928,559 B1 | 8/2005 | Beard | |
| 6,941,480 B1 | 9/2005 | Dai | |
| 7,058,824 B2 | 6/2006 | Plante et al. | |
| 7,072,138 B2 | 7/2006 | Schmidt | |
| 7,075,744 B2 | 7/2006 | Cumpson et al. | |

(Continued)

OTHER PUBLICATIONS

IBM, "Adaptive Power Management for Mobile Hard Drives, Adaptive Battery Life Extender", Jan. 1999, http://www.almaden.ibm.com/almaden/mobile_hard_drives.html, 13 pages.

(Continued)

*Primary Examiner* — Stefan Stoynov

(57) ABSTRACT

Adjusting power and/or performance settings of a data storage device (DSD) in a system including the DSD and a host in communication with the DSD. A driver executed on the host defines user settings for the DSD and determines a state of the system. The driver commands the DSD to adjust power and/or performance settings for the DSD based on the state of the system and the user settings.

23 Claims, 6 Drawing Sheets

(56) References Cited

U.S. PATENT DOCUMENTS

| | | | |
|---|---|---|---|
| 7,082,373 B2 | 7/2006 | Holle | |
| 7,089,432 B2 | 8/2006 | Schmidt | |
| 7,120,806 B1 | 10/2006 | Codilian et al. | |
| 7,126,857 B2 | 10/2006 | Hajeck | |
| 7,155,617 B2 | 12/2006 | Gary et al. | |
| 7,206,948 B2 | 4/2007 | Brauer | |
| 7,213,086 B2 | 5/2007 | Wyatt et al. | |
| 7,302,595 B2 | 11/2007 | de Cesare et al. | |
| 7,430,136 B2 | 9/2008 | Merry, Jr. et al. | |
| 7,443,627 B1 | 10/2008 | Krishnamoorthy et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,549,065 B2 | 6/2009 | Schutte | |
| 7,552,347 B2 | 6/2009 | Schutte | |
| 7,596,643 B2 | 9/2009 | Merry, Jr. et al. | |
| 7,609,472 B2 | 10/2009 | Atkinson | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,836,101 B2 * | 11/2010 | Crowther et al. | 707/805 |
| 7,853,809 B2 | 12/2010 | Zhang et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 7,982,999 B2 | 7/2011 | Koizumi et al. | |
| 8,078,901 B1 | 12/2011 | Meyer et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,214,661 B2 | 7/2012 | Cooper et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2004/0083396 A1 | 4/2004 | Perahia | |
| 2005/0144486 A1 * | 6/2005 | Komarla et al. | 713/300 |
| 2005/0174678 A1 | 8/2005 | Zayas et al. | |
| 2010/0174849 A1 | 7/2010 | Walston et al. | |
| 2010/0250793 A1 | 9/2010 | Syu | |
| 2010/0262392 A1 | 10/2010 | Murphy et al. | |
| 2010/0318824 A1 * | 12/2010 | Tinker | 713/323 |
| 2011/0099323 A1 | 4/2011 | Syu | |
| 2011/0283049 A1 | 11/2011 | Kang et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0132638 A1 | 5/2013 | Horn et al. | |
| 2013/0145106 A1 | 6/2013 | Kan | |
| 2013/0290793 A1 | 10/2013 | Booth et al. | |
| 2014/0059405 A1 | 2/2014 | Syu et al. | |
| 2014/0101369 A1 | 4/2014 | Tomlin et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0149826 A1 | 5/2014 | Lu et al. | |
| 2014/0157078 A1 | 6/2014 | Danilak et al. | |
| 2014/0173242 A1 * | 6/2014 | Huffman et al. | 711/170 |
| 2014/0181432 A1 | 6/2014 | Horn | |
| 2014/0223255 A1 | 8/2014 | Lu et al. | |

OTHER PUBLICATIONS

Microsoft, "Device Class Power Management Reference Specification", v 2.0, Jan. 10, 2000, 6 pages.

\* cited by examiner

| Partition | Power Setting | Performance Setting |
|---|---|---|
| 1 | 50% | - |
| 2 | 30% | 2x |
| 3 | - | 1x |
| 4 | 25% | 0.5x |
| ... | ... | ... |
| N | - | - |

FIG. 6

| Power | Performance |
|---|---|
| 0.5w | 10 |
| ... | ... |
| X | Y |

FIG. 7

USER CONTROLLED DATA STORAGE DEVICE POWER AND PERFORMANCE SETTINGS

CROSS-REFERENCE TO RELATED APPLICATION(S)

This application claims priority to U.S. Provisional Application No. 61/819,304, filed on May 3, 2013, the disclosure of which is hereby incorporated in its entirety.

BACKGROUND

Data storage devices (DSD), such as conventional hard disk drives (HDD), hybrid hard disk drives (SSHD), or solid state drives (SSD), are typically part of a system including a host which communicates with the SSD to store data on or retrieve data from the DSD. Although conventional DSDs usually have internal power management (PM) and performance settings to more efficiently use power, DSDs generally do not have information about a state of the system outside of the DSD. In addition, users of the system cannot easily adjust the power and performance settings of the DSD.

Because of the importance of preserving data, the use of drivers in managing the storage stack has traditionally been considered risky. Drivers may be too unpredictable for the absolute reliability requirements for storage devices. In addition, the bandwidth and computing power needed for a reliable driver has previously been unavailable or unfeasible.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 6 presents a table of individualized partition power and performance settings according to an implementation of the present disclosure; and FIG. 7 presents a power/performance matrix to show power and performance trade-offs according to an implementation of the present disclosure.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

Figure 1:
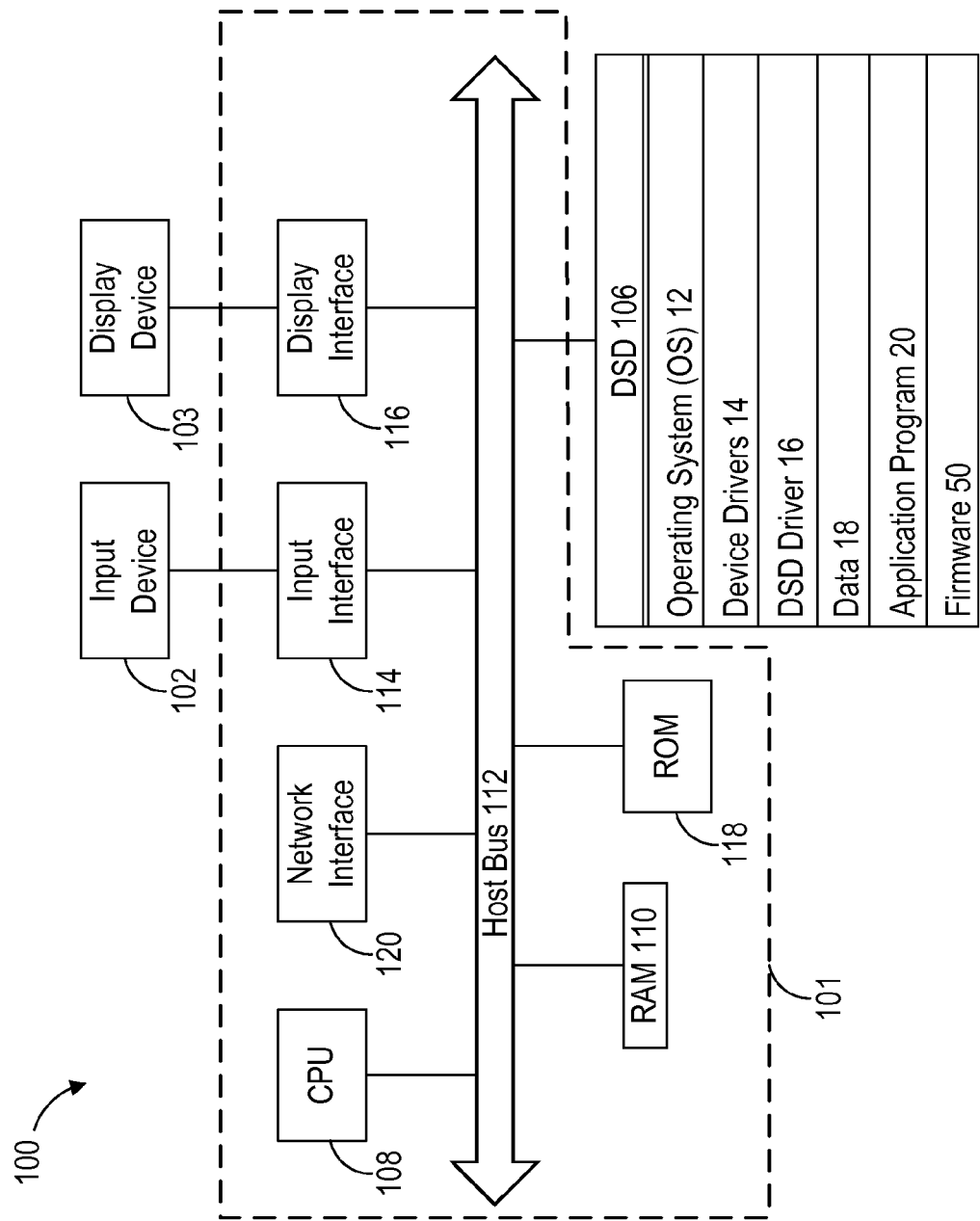
FIG. 1 presents a computer system having a host and a data storage device according to an implementation of the present disclosure.

FIG. 1 shows a computer system 100 which includes a host 101, an input device 102, a display device 103, and a data storage device (DSD) 106. The computer system 100 can be, for example, a computer system (e.g., desktop, mobile/laptop, tablet, smartphone, etc.) or other electronic device. In this regard, the computer system 100 may be a stand-alone system or part of a network. Input device 102 can be a keyboard, scroll wheel, pointing device, or other human interface device allowing a user of the computer system 100 to enter information and commands to the computer system 100, or to allow the user to manipulate objects displayed on the display device 103. The display device 103 may be a monitor, television set, projector, or any other device capable of providing visual output. In other implementations, the input device 102 and the display device 103 can be combined into a single component, such as a touch-screen that displays objects and receives user input.

The host 101 includes a central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. The CPU 108 interfaces with a host bus 112. Also interfacing with host bus 112 are a random access memory (RAM) 110, an input interface 114 for the input device 102, a display interface 116 for the display device 103, a read only memory (ROM) 118, a network interface 120 and the DSD 106.

The RAM 110 is a volatile memory of the host 101 that interfaces with the host bus 112 so as to provide information stored in the RAM 110 to the CPU 108 during execution of instructions in software programs such as an operating system (OS) 12 and device drivers 14 stored on the DSD 106. More specifically, the CPU 108 first loads computer-executable instructions from the DSD 106 or another data storage device into a region of the RAM 110. The CPU 108 can then execute the stored process instructions from the RAM 110. Data such as data to be stored in the DSD 106 or data retrieved from the DSD 106 can also be stored in the RAM 110 so that the data can be accessed by the CPU 108 during execution of software programs to the extent that such software programs have a need to access and/or modify the data.

As shown in FIG. 1, the DSD 106 may store one or more of the OS 12, the device drivers 14, a DSD driver 16, data 18, and an application program 20. Device drivers 14 can provide software interfaces to devices such as the input device 102 and the display device 103. The DSD 106 further stores a firmware 50. The firmware 50 can include computer-readable instructions used by the DSD 106. The DSD 106 may be an HDD, SSD, SSHD, or any other storage medium with a controller. Those of ordinary skill in the art will appreciate that the DSD 106 can include more or less than those elements shown in FIG. 1. In some implementations, DSD 106 may not be coupled to a host 101 in the manner depicted in FIG. 1. For example, a group of DSDs can be configured in a data storage environment and further controlled by in a controller such as a RAID controller. As another example, DSD 106 may be located remotely from host 101.

Figure 2:
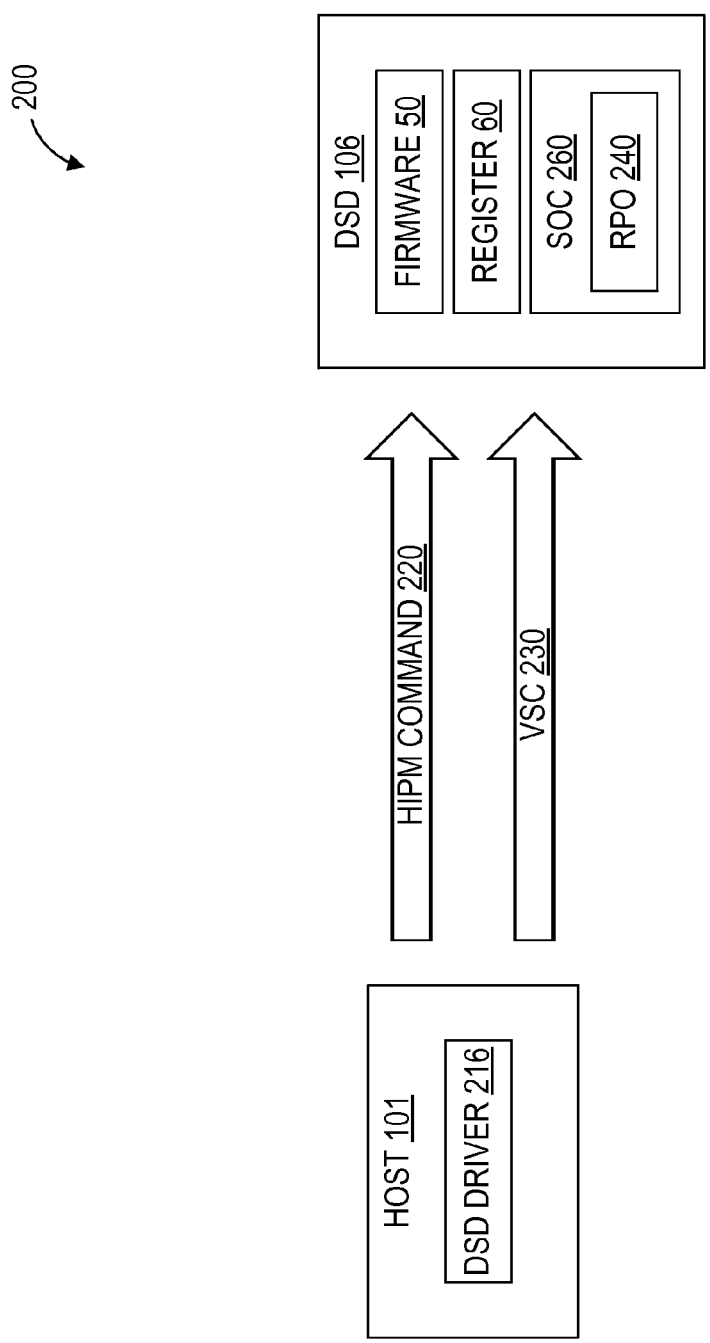
FIG. 2 presents an interaction between the host and the data storage device according to an implementation of the present disclosure.

Device power management generally requires cooperation between the host and the device (e.g., DSD). For instance, Serial ATA (SATA) Link Power Management can be divided into two types: Host-Initiated Power Management (HIPM), and Device-Initiated Power Management (DIPM). FIG. 2 illustrates a power management interaction of a computer system 200, which may correspond to the computer system 100 in FIG. 1.

The computer system 200 includes the host 101 interacting with the DSD 106. The host 101 includes a DSD driver 216, which may be a copy of the DSD driver 16 stored in the RAM 110 for execution by the CPU 108 of the host 101. The DSD 106 includes a register 60 and a System-On-Chip (SOC) 260 for internal use by the DSD 106. The SOC 260 includes a processor that may run the firmware 50 and further use the register 60 for DIPM operations. The register 60 may be a memory, such as a flash memory, DRAM, or storage medium of the DSD 106, configured to store power and performance settings. For example, the register 60 may store power and performance settings for the DSD 106 as a table or may use a pointer to a table of values such as timer values for DSD operations. Values for the time to spin down or spin up a disk, or how long other specific commands take to complete varies for different DSDs, and therefore, these values are usually managed by the DSD itself, rather than the host.

The host 101 sends HIPM command 220 as a power management command to the DSD 106 based on current power and performance settings of the computer system 200. For example, the host 101 may detect idle activity lasting above an idle period threshold and accordingly send HIPM command 220 to put DSD 106 into a low-power state, such as standby or to spin down the disk.

When processing received power management commands, the register 60 can be used to determine appropriate timeout periods for DIPM operations, including transitioning into a low-power state.

In a conventional PM system, the DSD is not aware of the state of the computer system. For example, if the computer system was unplugged (i.e. on battery power), the DSD would not accordingly adjust its power or performance settings. In the computer system 200, the DSD driver 216 allows the host 101 to better communicate the state of the computer system 200, such as a power status of the computer system 200, to the DSD 106.

The DSD driver 216 may have a user interface (UI) which allows a user of the computer system 200 to set or adjust power and performance settings for the DSD 106. The UI may include a slider bar that the user can slide between maximizing performance and maximizing power savings. In addition, an advanced menu may allow the user to select different power and performance operating states.

Some example states include: a high performance state, which provides for the best performance and the least amount of power savings features; a balanced state, where the DSD still performs but has more aggressive power savings implemented; a longest battery life state, where the performance is dialed down to allow for the most battery life possible; an adaptive power/performance mode, where the driver steps the performance down based on the condition of the system, such as maximum performance when a battery is fully charged but reduced performance to save power as the battery drains; and a scenario based power and performance mode, where the user can specify which types of activities or programs should have the best performance, such as playing games or streaming movies where a spin-down for power savings hurts the user experience.

Certain applications, such as listening to music, do not require a disk drive to be continuously spinning as the data can be buffered. Other applications, such as playing games or streaming movies, are more data intensive. Spinning the disk down can cause glitches or other undesired behavior and can hurt performance to the point that the user experience is made worse. The DSD driver 216 can allow the user to specify different power management schemes for different applications or types of applications as needed. The DSD driver 216 can further have default profiles which can be suggested to the user based on the state of the system.

The host 101 can issue appropriate HIPM commands 220 as needed. The DSD driver 216 can intercept the HIPM commands 220 and evaluate them against the user's requests. For example, the computer system 200 may be unplugged, prompting a power-saving state by the host 101. The user may be watching a movie and may have previously set a high performance mode for watching movies, in order to override any power-saving features called by the host 101. The DSD driver 216 can either suppress or cancel the HIPM command 220, or send an altered or alternative HIPM command 220 to the DSD 106. Alternatively, rather than intercepting the HIPM commands 220, the DSD driver 216 can essentially take over all HIPM operations. To send additional information or commands not available through the HIPM command 220, the DSD driver 216 can also send Vendor Specific Codes (VSC) 230 as power management commands to the DSD 106.

On the device side, the SOC 260 may include a processor capable of executing the firmware 50 and accessing the register 60. The firmware 50 may implement DIPM operations. The register 60 may hold a table or a pointer to a table of timer settings and/or values. In one implementation, the register 60 can associate various levels of idle states with periods of inactivity for DIPM. For example, in accordance with settings in the register 60, DSD 106 may enter an initial idle state 1 after 30 ms of no activity. After another 200 ms of no activity, the DSD 106 may enter an idle 2 state. After another 300 ms of no activity, the DSD 106 may enter an idle 3 state. After another 20 ms, the DSD may spin down its drive.

The VSC 230 may alert the DSD 106 of a change in the computer system 200. The firmware 50 is configured to receive the VSC 230 and respond accordingly. If the computer system 200 becomes unplugged and switches to battery power, the VSC 230 may inform the DSD 106 of this change in the power status of the computer system 200. The VSC 230 may send an alert of the change in state of the computer system 200 or may instead be an appropriate command in response to the change in the computer system 200.

The firmware 50 receives the VSC 230 and can configure the power and performance settings for the DSD 106 (such as timer settings and/or values) in the register 60. The values could be increased or decreased as needed and the table rewritten. Alternatively, a different table or a different portion of the table can be used. If the register 60 holds a pointer to a table, the pointer can be updated. Thus, the VSC 230 can be used to override or modify the default DIPM.

The DSD 106 can override HIPM as well as DIPM operations. Altering the DIPM is advantageous as it is easier to manage operations such as spin up or down. PM tasks are offloaded from the CPU 108 to the SOC 260. However, this approach provides only general overall performance management because the DSD 106 lacks visibility of the state of the computer system 200, such as if certain applications are running.

Altering the HIPM provides more adaptability as it is running on the host 101 and able to monitor the state of the system. HIPM has access to which applications are running, and whether the system is plugged in or running off of a battery.

The DSD driver 216 may further have adaptive settings. The DSD driver 216 may monitor the process tree, using a listener, for changes and accordingly adjust profiles or send HIPM commands 220 or VSCs 230. The DSD driver 216 may also utilize hysteresis and learning to look at a program's historical usages and determine which performance features to adjust.

The VSC 230 can also change performance settings by overriding, modifying, or otherwise adjusting a rotational position optimization (RPO) algorithm executed by the DSD 106. RPO algorithms improve performance of disk drives by reducing the rotational latency of a disk of the DSD 106 and/or a latency in moving a head of the DSD 106 (i.e., the seek and settle latency of the head). When a DSD receives commands, the commands are stored in a command queue. The RPO algorithm selects the command with the least access time as the next command to execute. The RPO algorithm may determine access times by calculating seek, settle, and rotational latencies. Additional details relating to RPO may be found in U.S. Pat. No. 6,968,422 B1, issued on Nov. 22, 2005, the disclosure of which is hereby incorporated by reference.

In FIG. 2, the SOC 260 executes an RPO 240. The VSC 230 can override, for example, the next command selected by the RPO 240. Alternatively, the VSC 230 can alter the algorithm of the RPO 240. The VSC 230 can alter the RPO 240 to bias performance for specified applications or logical partitions of the DSD 106 which can be identified with a range of logical block addresses (LBAs) used by the host 101 to address data. For example, the VSC 230 can indicate a desire to slow down performance of particular applications or commands associated with a particular logical partition in order to save battery power. The RPO 240 can be altered to not always select the next command with the least access time so as to bias performance for a specified application or logical partition.

Figure 3:
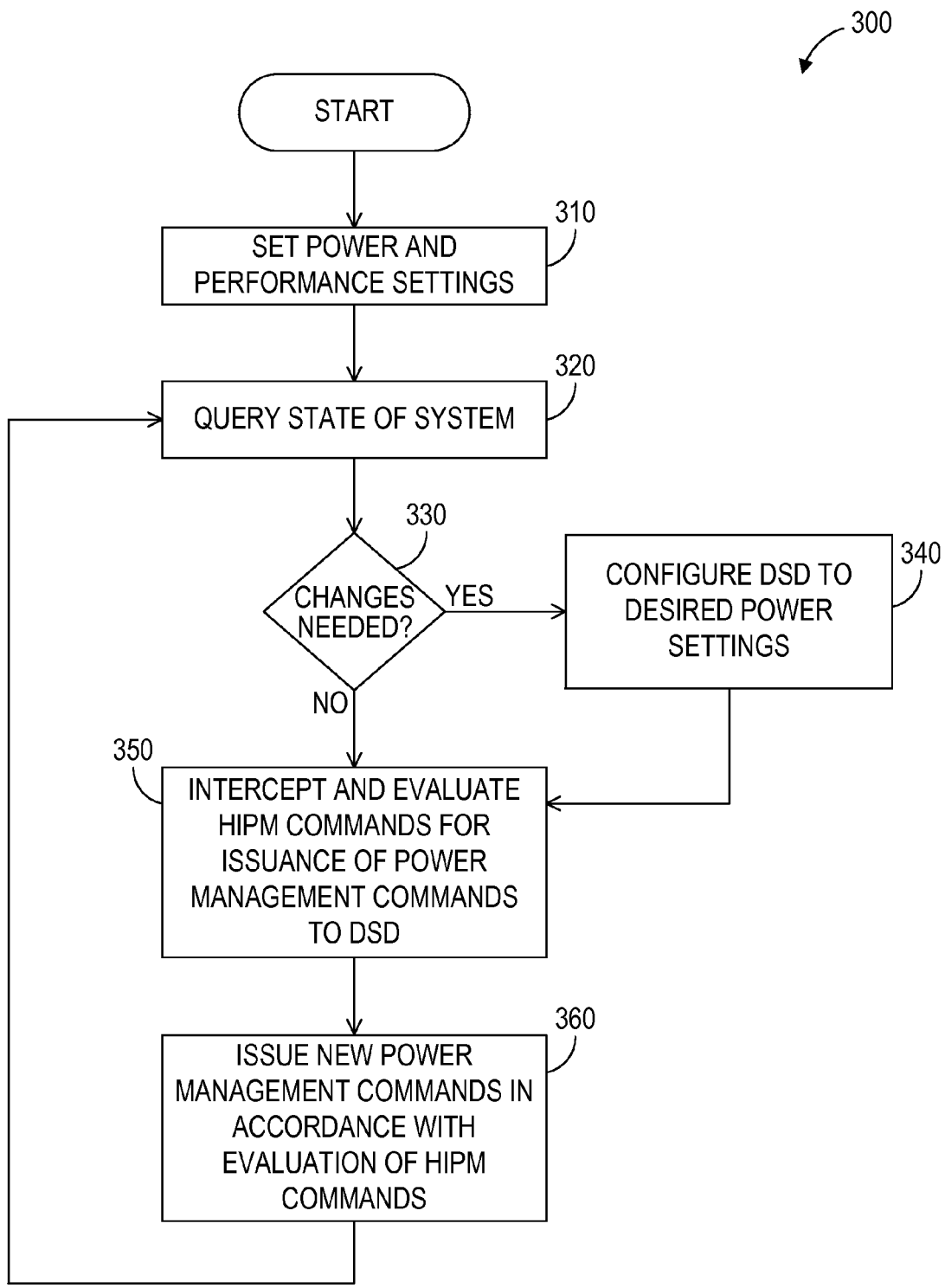
FIG. 3 presents a flowchart of a power management process according to an implementation of the present disclosure.

FIG. 3 depicts a flowchart 300 of one implementation of a power management process executed by the DSD driver 216. At 310, the power and performance settings are set through the DSD driver 216. The settings may be set automatically by the DSD driver 216, or the settings may be manually entered by a user of the computer system 200 using a UI of the DSD driver 216. For example, the user may select a scenario based power and performance mode, and further select which applications should have the best performance. At 320, the state of the system is queried to determine, for example, what applications and/or processes are running and whether the computer system 100 is plugged in or running on battery and how much battery power remains.

At 330, the settings of the DSD 106 are evaluated to see if they need to be changed, based on the power and performance settings previously set at 310 and the state of the computer system 200. This may be performed by the DSD driver 216 or another component such as the SOC 260. For example, if the computer system 200 is unplugged, then at 340 a VSC 230 may be sent to the DSD 106 in order to update the register 60 with power-saving settings.

At 350, the DSD driver 216 intercepts and evaluates HIPM commands generated by the host 101. The DSD driver 216 determines whether to send the HIPM commands as is, or to send out alternate commands, or to send no commands. At 360, the DSD driver 216 issues any new power management commands in accordance with the evaluation of HIPM commands at 350.

Figure 4:
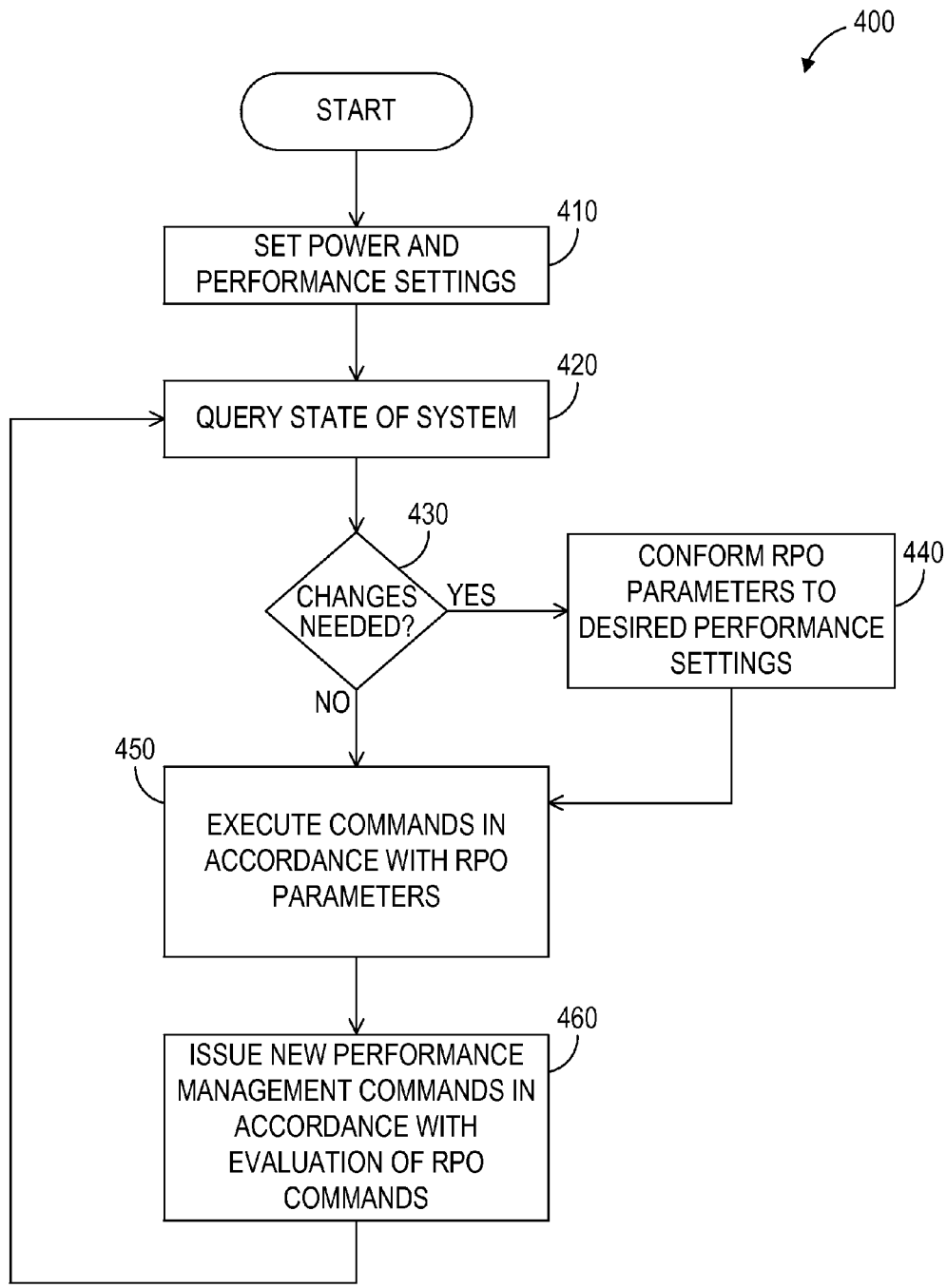
FIG. 4 presents a flowchart of a performance management process according to an implementation of the present disclosure.

FIG. 4 depicts a flowchart 400 of one implementation of a performance management process executed by the DSD driver 216. At 410, the power and performance settings are set through the DSD driver 216. The settings may be set automatically by the DSD driver 216, or the settings may be manually entered by a user of the computer system 200 using a UI of the DSD driver 216. For example, the user may select a scenario based power and performance mode, and further select which applications should have the best performance. At 420, the state of the system is queried to determine, for example, what applications and/or processes are running and whether the computer system 100 is plugged in or running on battery and how much battery power remains.

At 430, the settings of the DSD 106 are evaluated to see if they needed to be changed, based on the power and performance settings previously set at 410 and the state of the computer system 200. This may be performed by the DSD driver 216 or another component such as the SOC 260. For example, if the computer system 200 is running an application having a reduced performance bias, then at 440 a VSC 230 may be sent to the DSD 106 in order to modify or otherwise alter the RPO 240.

At 450, RPO parameters generated by the SOC 260 are conformed to the settings set at either at 410 or, if a change was needed, at 440. For example, the DSD 106 may adjust RPO parameters such as queue depth, weighting factor, delay, etc. At 460, the DSD 106 executes commands in accordance with the RPO parameters at 450.

Figure 5:
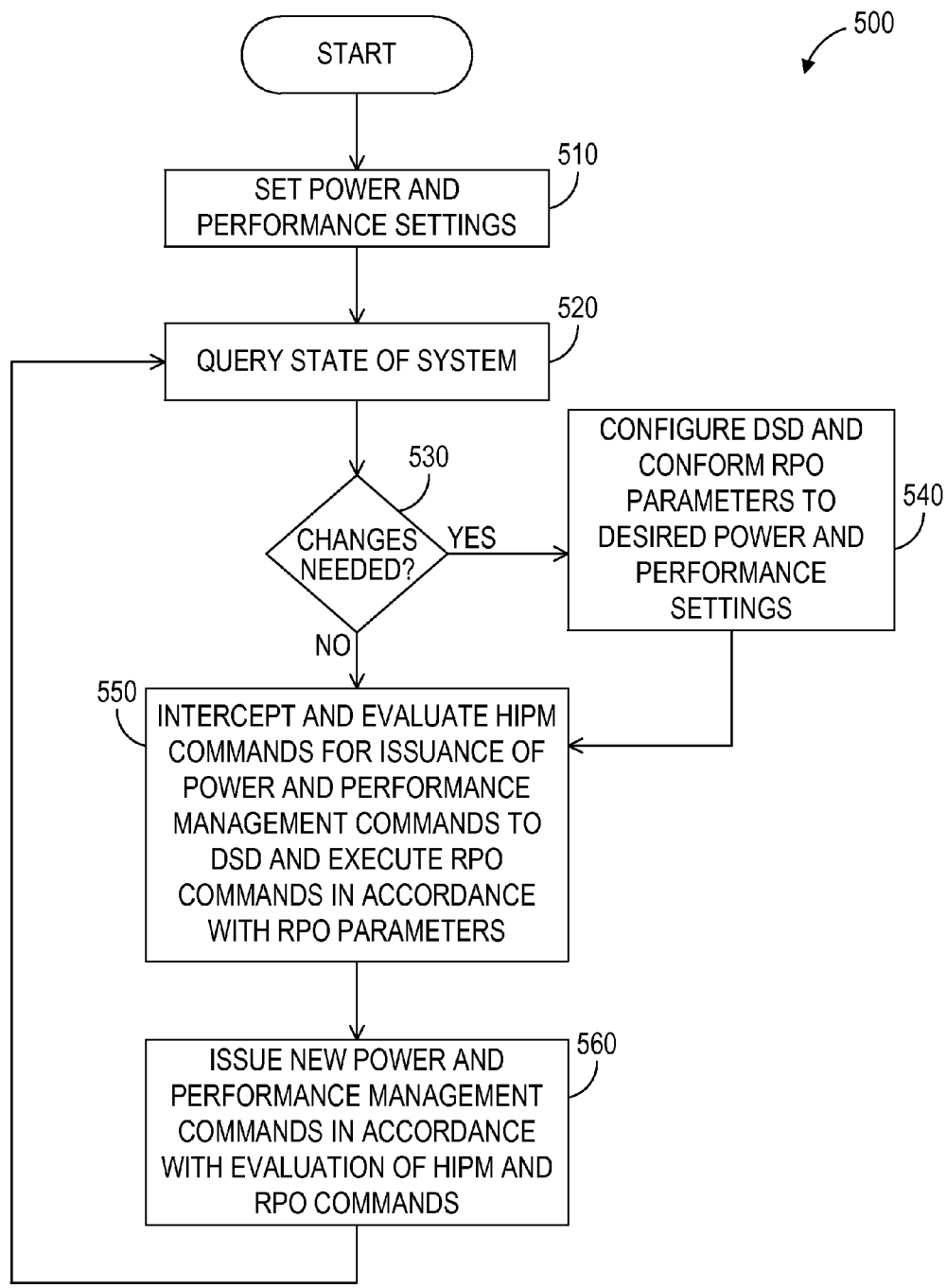
FIG. 5 presents a flowchart of a power and performance management process according to an implementation of the present disclosure.

FIG. 5 depicts a flowchart 500 of one implementation of a power and performance management process executed by the DSD driver 216. At 510, the power and performance settings are set through the DSD driver 216. The settings may be set automatically by the DSD driver 216, or the settings may be manually entered by a user of the computer system 200 using a UI of the DSD driver 216. For example, the user may select a scenario based power and performance mode, and further select which applications should have the best performance. At 520, the state of the system is queried to determine, for example, what applications are running and whether the computer system 100 is plugged in or running on battery and how much battery power remains.

At 530, the settings of the DSD 106 are evaluated to see if they need to be changed, based on the power and performance settings previously set at 510 and the state of the computer system 200. This may be performed by the DSD driver 216 or another component such as the SOC 260. For example, if the computer system 200 is unplugged, then at 540 a VSC 230 may be sent to the DSD 106 in order to update the register 60 with power-saving settings. In addition, if the computer system 200 is running an application having a reduced performance bias, then at 540 a VSC 230 may be sent to the DSD 106 in order to modify or otherwise alter the RPO 240.

At 550, the DSD driver 216 intercepts and evaluates HIPM commands generated by the host 101. The DSD driver 216 determines whether to send the HIPM commands as is, or to send out alternate commands, or to send no commands. In addition, RPO parameters generated by the SOC 260 are conformed to the settings set at either 510 or, if a change was needed, at 540. For example, the DSD 106 may adjust RPO parameters such as queue depth, weighting factor, delay, etc. At 560, the DSD driver 216 issues any new power management commands in accordance with the evaluation of HIPM commands at 550. The DSD 106 also executes commands in accordance with the RPO parameters at 550.

Although the power and performance settings may be individualized by application, the power and performance settings may also be individualized by partitions in the DSD 106. The host 101 can create logical partitions in the DSD 106. The host 101 may send the starting and ending LBAs of each partition to the DSD 106 to identify the partitions. The DSD 106 can then infer from the LBA of each input/output (I/O) command which partition the command refers to, and executes the I/O command based on the power and/or performance settings for that partition.

FIG. 6 presents a table 600 of exemplary power/performance settings for partitions according to one implementation of the present disclosure. The table 600 may be stored in the DSD 106, for example in the SOC 260, the register 60, or as part of the OS 12 or the DSD driver 16. The power settings represent a percentage of maximum power to use, with 100% being the highest value. The performance settings represent a performance biasing, with 1× being a baseline or default performance level, which may further correspond to a specific number of input/output operations per second (IOPS). As seen in FIG. 6, the partition 1 may have a power setting of 50%, to limit power usage to half. The partition 1 has no performance setting, which may represent a default performance setting, or indicates no change to the current performance setting. The partition 2 has a power setting of 30% as well as a performance setting of 2×, indicating double the baseline performance. The partition 3 has no power setting but has the baseline 1× performance setting. The partition 4 has a power setting of 25%, and a performance setting of 0.5×, indicating a reduced performance bias of one half. In this way, each partition may have its own power and/or performance settings defined.

In one implementation, the DSD 106 may be part of a cloud storage sold by a cloud storage provider. Multiple tenants or clients may rent or purchase cloud space on the DSD 106. Each tenant's partition or portion may be designated by, for example, logical block addresses (LBA). Depending on the DSD 106, LBA partitions may perform differently. For example, if the DSD 106 comprises an HDD, LBA partitions on the outer disk (OD) may have twice the sequential data rate as LBA partitions on the inner disk (ID). The cloud storage provider may wish to charge more for LBA partitions having faster performance. Alternatively, the cloud storage provider may wish to use custom power/performance settings for each LBA partition, using settings similar to the table 600. The faster LBA partitions may be throttled down such that all LBA partitions perform similarly.

The DSD 106 may further provide the host 101 with a power/performance matrix. The power/performance matrix may be stored in the DSD 106, for example in the register 60 or as part of the OS 12 or the DSD driver 16. The power/performance matrix informs the host of the trade-offs necessary to achieve certain settings by indicating a performance of the DSD 106 at different power levels. For example, the DSD 106 can send a power/performance matrix to the host 101 to provide a comparison of watts consumed versus IOPS delivered. This information may also be used by a UI of the DSD driver 16 to provide information to a user of the computer system 100. Because each DSD has different power/performance profiles, providing the host 101 with this information allows the host 101 or the user to understand the effects on power by adjusting performance and vice versa. FIG. 7 presents a power/performance matrix 700. The values chosen are merely exemplary. For example, an increase of X watts consumed may provide Y additional IOPS.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for managing power and performance of a data storage device (DSD) in a system including a host, the method comprising:
    setting power and performance settings for the DSD;
    querying a state of the host;
    configuring the DSD based on the power and performance settings and the state of the host;
    intercepting a host-initiated power management (HIPM) command;
    evaluating, by the host, the intercepted HIPM command based on the power and performance settings for the DSD; and
    cancelling or altering the HIPM command in accordance with the evaluation of the HIPM command.

2. The method of claim 1, further comprising
issuing a new power management command from the host to the DSD in accordance with the evaluation of the HIPM command.

3. The method of claim 1, wherein evaluating the HIPM command includes hysteresis and learning of application usage.

4. The method of claim 1, wherein configuring the DSD includes overriding or modifying a device-initiated power management (DIPM) command of the DSD.

5. The method of claim 1, wherein configuring the DSD includes issuing a vendor specific code (VSC) to the DSD.

6. The method of claim 5, wherein the issued VSC is configured to change a DIPM mode of the DSD.

7. The method of claim 5, wherein the issued VSC is configured to change a timer setting of the DSD.

8. The method of claim 1, wherein setting the power and performance settings includes selecting a power management profile among a plurality of power management profiles.

9. The method of claim 1, wherein setting the power and performance settings includes selecting custom power and performance settings for an application executed by the host.

10. The method of claim 9, wherein configuring the DSD is based on the custom power and performance settings for the application when the state of the host indicates that the application is being executed by the host.

11. The method of claim 1, wherein querying the state of the host includes determining a power status of the host.

12. The method of claim 1, wherein the setting the power and performance settings further comprises selecting the power and performance settings through a user interface (UI) of a driver of the DSD.

13. The method of claim 1, wherein the DSD includes a rotatable disk for storing data and a head for reading data from and writing data to the disk, and wherein the method further comprises:
adjusting a rotational position optimization (RPO) algorithm based on the power and performance settings for the DSD, wherein the RPO algorithm adjusts a delay in performing a command due to a latency in rotating the disk and/or a latency in moving the head; and
issuing a performance management command to the DSD in accordance with the adjustment of the RPO algorithm.

14. The method of claim 1, wherein setting the power and performance settings further comprises selecting custom power and performance settings for a logical partition for data stored in the DSD.

15. The method of claim 1, wherein configuring the DSD further comprises sending the host a power/performance matrix which indicates performance of the DSD at different power levels.

16. The method of claim 1, wherein the state of the host indicates whether the system is plugged in or running on battery.

17. The method of claim 1, wherein the state of the host indicates how much battery power remains for the system.

18. The method of claim 1, wherein the state of the host indicates applications and/or processes running on the host.

19. A data storage device (DSD) in communication with a host, the DSD comprising:
a memory storing power and performance settings for the DSD; and
a processor configured to:
receive a power management command from the host, wherein the power management command is based on an evaluation by the host of an intercepted host initiated power management (HIPM) command that is cancelled or altered to form the power management command; and
configure the DSD in accordance with the power management command received from the host.

20. The DSD of claim 19, wherein the processor configures the DSD by overriding or modifying a device-initiated power management (DIPM) command of the DSD.

21. The DSD of claim 19, wherein the memory further stores custom power and performance settings for a logical partition for data stored in the DSD.

22. The DSD of claim 19, wherein the processor is further configured to send the host a power/performance matrix which indicates performance of the DSD at different power levels.

23. The DSD of claim 19, wherein the DSD further comprises:
a rotatable disk for storing data; and
a head for reading data from and writing data to the disk; and
wherein the processor is further configured to adjust a rotational position optimization (RPO) algorithm based on the power management command received from the host.

* * * * *